No. 866,809. PATENTED SEPT. 24, 1907.
F. B. PRICE.
COFFEE PERCOLATOR.
APPLICATION FILED DEC. 19, 1906.
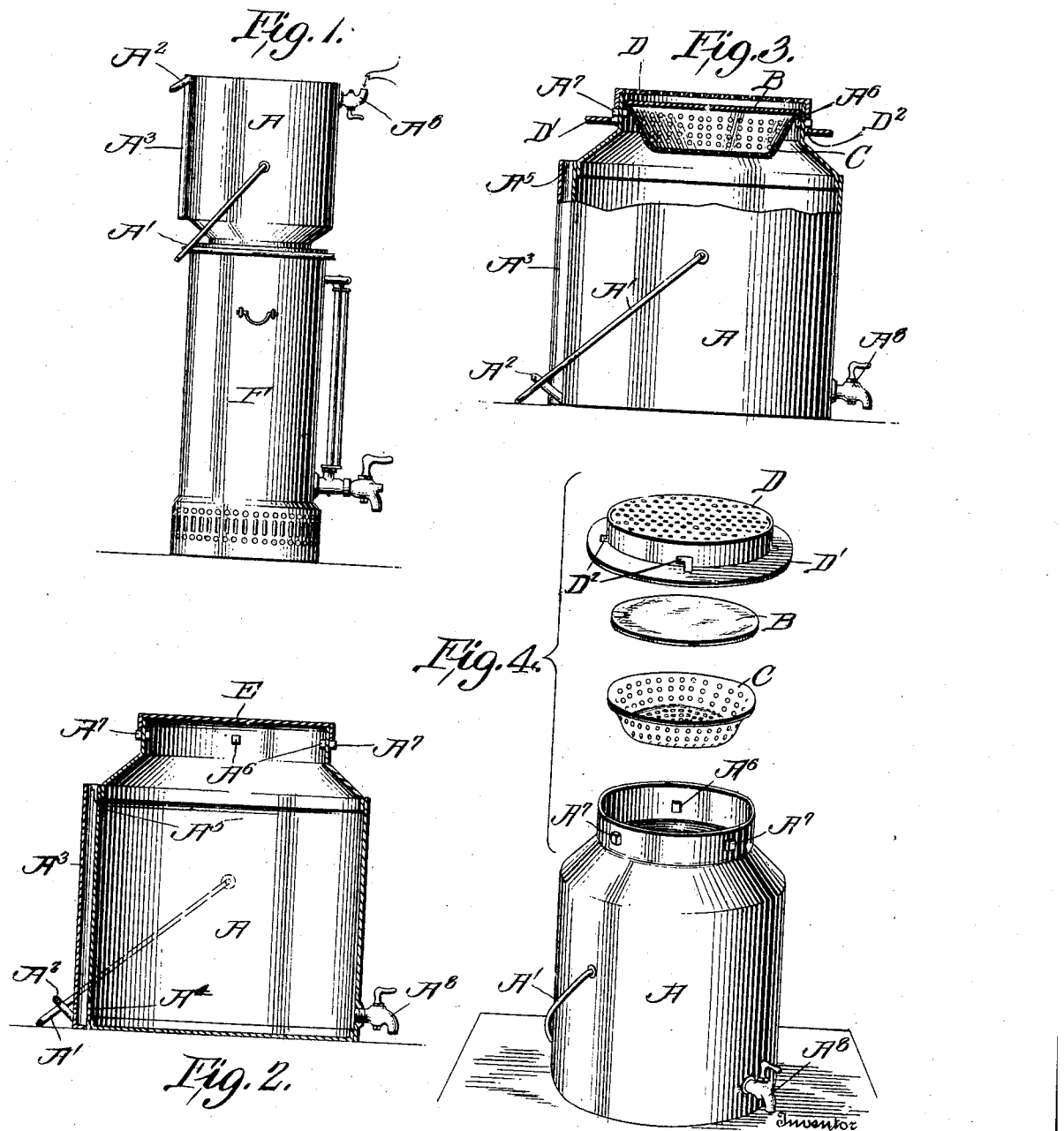

UNITED STATES PATENT OFFICE.

FREEMAN B. PRICE, OF BUTTE, MONTANA.

COFFEE-PERCOLATOR.

No. 866,809.  Specification of Letters Patent.  Patented Sept. 24, 1907.

Application filed December 19, 1906. Serial No. 348,646.

*To all whom it may concern:*

Be it known that I, FREEMAN B. PRICE, a citizen of the United States, residing at Butte, in the county of Silverbow and State of Montana, have invented a new and useful Improvement in a Coffee-Percolator, of which the following is a specification.

This invention relates to a percolator intended for use with coffee urn and the object of the invention is a device of this kind which will preserve the aroma of the coffee and will prevent the filter paper through which the coffee is filtered from becoming clogged either by the weight of the coffee bearing directly upon it thereby saturating the filter paper with coffee grounds or becoming coated with albumen when the egg is broken into the coffee for the purpose of enriching it in color.

The invention consists of the novel features hereinafter described pointed out in the claims and shown in the accompanying drawings, in which, Figure 1 is a side elevation of my device in position upon a coffee urn. Fig. 2 is a vertical section through the percolator casing showing the position of the same, while the coffee is being prepared. Fig. 3 is a view of the percolator partly in side elevation and partly in section showing the strainer, filter paper and perforated cap in position ready for inversion of the percolator. Fig. 4 is a perspective view showing the various parts detached.

In these drawings A represents a cylindrical receptacle having a contracted upper portion which when the receptacle is inverted rests upon the top of a coffee urn of the usual kind.

The receptacle A is provided with a bail A′ and also upon one side and at its lower edge with a handle $A^2$. Extending vertically up the side of the receptacle A is a tube $A^3$ which opens inwardly at its lower end as shown at $A^4$ and at its upper end opens into the outer air as shown at $A^5$.

Upon the neck portion of the receptacle are placed a plurality of inwardly extending lugs $A^6$ and outwardly extending lugs $A^7$. In connection with this receptacle I employ a disk B, of any suitable filter paper and a perforated pan C. I also provide a cap D having a perforated top and an annular flange D′ and having bayonet slots $D^2$ cut therein. I also provide a non-perforated cover E shown in Fig. 2. The percolator is also provided with a faucet $A^8$ carried by the casing A.

In use the coffee is prepared in the usual manner by boiling in the receptacle A, the top of which is closed by the cover E. When the coffee has been boiled a sufficient length of time, the cover E is removed and the pan C is dropped into the receptacle A and is held in the neck of the receptacle by the lugs $A^6$. The filter paper B is then dropped into place upon the pan C and the cap D is placed upon the receptacle and is locked into position by engagement of the lugs $A^7$ with the slots $D^2$. The receptacle A is then placed upon an urn F in a vertical position as shown in Fig. 1. The coffee percolates through the perforations of the pan C through the filter paper B and through the cap D.

It will be obvious that when in an inverted position, the pan C will hold the coffee grounds, and also the egg if one is used out of contact with the filter paper thus keeping the same free from sediment and preventing it becoming clogged or in an unsanitary condition, insuring clearness of the coffee. The filter paper it will be obvious is held when the receptacle is inverted between the pan C and the perforated cap D.

The faucet $A^8$ can be employed both for drawing off coffee from the receptacle, or if after the receptacle is inverted the coffee is too strong boiling water can be introduced into the receptacle A through the faucet $A^8$ in the manner illustrated in Fig. 1.

The device is especially adapted for the making of coffee upon a large scale as the holding of the coffee grounds out of contact with the filter paper increases the quantity filtered in a given time.

The tube $A^3$ furnishes an exit for steam and air when the receptacle is in its normal position and in its inverted position permits inward flow of air to occupy the space vacated by the liquid as it percolates through the filter paper.

Having thus fully described my invention, what I claim as new and desire to secure by Letters Patent, is:—

A device of the kind described comprising a receptacle, said receptacle having a contracted neck portion, inwardly and outwardly extending lugs formed on said neck portion, a perforated pan fitting within the neck portion and engaged by the inwardly extending lugs, a filter paper resting upon said pan when the receptacle is in its normal position, and a cap adapted to tightly fit over the neck portion, said cap having a perforated top and having slots adapted to engage the outwardly extending lugs.

FREEMAN B. PRICE.

Witnesses:
ALICE M. SMITH,
MARY F. PRICE,
A. A. LEWIS.